(12) United States Patent
Prevot et al.

(10) Patent No.: US 8,136,211 B2
(45) Date of Patent: *Mar. 20, 2012

(54) CLAMPING COLLAR

(75) Inventors: Fabrice Prevot, Selles-sur-cher (FR); Jérôme Jaffre, Chaumont sur Tharonne (FR); Nicolas Rigollet, Romorantin (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 496 days.

This patent is subject to a terminal disclaimer.

(21) Appl. No.: 12/303,907

(22) PCT Filed: Jun. 8, 2007

(86) PCT No.: PCT/FR2007/051392
§ 371 (c)(1),
(2), (4) Date: Dec. 8, 2008

(87) PCT Pub. No.: WO2008/006989
PCT Pub. Date: Jan. 17, 2008

(65) Prior Publication Data
US 2010/0162533 A1 Jul. 1, 2010

(30) Foreign Application Priority Data
Jun. 9, 2006 (FR) ...................... 06 52085

(51) Int. Cl.
*F16L 33/06* (2006.01)
(52) U.S. Cl. ...................... 24/279

(58) Field of Classification Search ................ 24/20 LS, 24/279–282, 284–286; 285/367, 410, 420
See application file for complete search history.

(56) References Cited

U.S. PATENT DOCUMENTS

| | | | |
|---|---|---|---|
| 1,584,498 A | 5/1926 | Vitek |
| 1,596,944 A | 8/1926 | Philbrook |
| 4,521,940 A | 6/1985 | Oetiker |
| 2002/0038495 A1 | 4/2002 | Anthes et al. |

FOREIGN PATENT DOCUMENTS

| | | |
|---|---|---|
| CH | 234172 A | 9/1944 |
| DE | 744975 C | 2/1944 |
| DE | 1717978 U | 3/1956 |
| DE | 3926626 A1 | 10/1990 |
| EP | 1195531 A1 | 4/2002 |
| FR | 896003 A | 2/1945 |
| FR | 2522086 A | 8/1983 |
| GB | 592211 A | 9/1947 |

*Primary Examiner* — James Brittain
(74) *Attorney, Agent, or Firm* — The Webb Law Firm

(57) ABSTRACT

A clamping collar comprising: a belt having two free ends, at least one of said free ends being curved back to form a loop, said loop being defined by an outer belt portion and by an underlying inner belt portion; and a tightening system suitable for co-operating with said loop so as to tighten said belt; in which clamping collar said outer belt portion presents a pushed-in portion, set back relative to the outer outline of the loop, which pushed-in portion defines a tightening wall with which the tightening system comes into engagement, and is flanked on either side by respective ones of two edge segments of the outer belt portion.

13 Claims, 4 Drawing Sheets

CLAMPING COLLAR

BACKGROUND OF THE INVENTION

The invention relates to a clamping collar.

Such a collar can be used to connect pipes, in particular in the automobile industry or in the aircraft industry (e.g. to connect pipes of the exhaust system or of the system for depolluting combustion gases).

More particularly, the invention relates to a clamping collar of the type comprising:

- a belt having two free ends, at least one of said free ends being curved back to form a loop, said loop being defined by an outer belt portion and by an underlying inner belt portion; and
- a tightening system suitable for co-operating with said loop so as to tighten said belt.

Generally, both of the free ends of said belt are curved back so as to form respective loops, and said tightening system makes it possible bring said loops closer together for tightening said belt.

A collar of this type is described in Document FR 2 522 086. That collar has a tightening system with two semi-cylindrical retaining pieces that are received inside respective ones of the two loops of the collar. Such retaining pieces can be referred to as "blocks" or as "gudgeons".

The first block is provided with a tapped through hole and the second block is provided with a smooth through hole. The tightening system further comprises a screw having a threaded shank and a screw head. Each loop of the collar is provided two openings that are in register with each other so that the shank of the screw passes through each of the two loops. In addition, the shank of the screw passes freely through the smooth hole and engages in the tapped hole. While the screw is being screwed into the first block, the screw head comes into engagement with the second block which then pushes against the inner belt portion of one loop, while the first block pushes against the inner belt portion of the other loop. The collar is thus tightened by bringing said loops closer together.

SUMMARY OF THE INVENTION

An object of the invention is to propose a clamping collar of the above-mentioned type that is not provided with any blocks, so as to limit the number of parts of the collar and, also, so as to simplify assembly thereof, and/or so as to reduce the manufacturing cost thereof, while also maintaining good clamping performance.

This object is achieved by a clamping collar of the above-mentioned type in which said outer belt portion presents a pushed-in portion, set back relative to the outer outline of the loop, which pushed-in portion defines a tightening wall with which the tightening system comes into engagement, and is flanked on either side by respective ones of two edge segments of the outer belt portion.

Since the tightening system comes into engagement with the tightening wall of the outer belt portion, it is not necessary for a block to be present inside said loop.

In addition, with the collar of the invention, and unlike with the collar of FR 2 522 086, the forces exerted on the loop by the tightening system are no longer exerted on the inner belt portion, via the inside of the loop, but rather they are exerted on the outer belt portion, via the outside of the loop. In order to take account of this new distribution of the forces, said edge segments are provided and they act as stays and retain the loop portion that is situated downstream from the tightening wall in order to prevent the downstream portion of the loop from deforming during the tightening. In the present Application, "upstream" and "downstream" are defined relative to the direction of the force exerted by the tightening system on the loop in question.

BRIEF DESCRIPTION OF THE DRAWINGS

The invention and its advantages can be better understood on reading the following detailed description of examples of collars of the invention. This description refers to the accompanying figures, in which.

DESCRIPTION OF THE PREFERRED EMBODIMENTS

Figure 1:
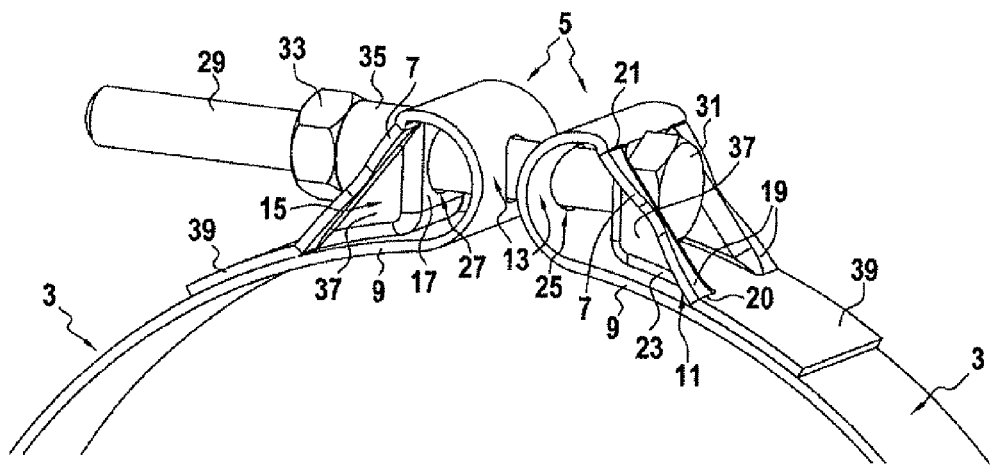
FIGS. 1 and 2 show a first example of a collar.

The examples of collars shown in the figures present numerous common characteristics. These common characteristics are described below and are referenced in the figures by like numerical references.

Each clamping collar comprises a belt 3 with two free ends. Each of the free ends is curved back in such a manner as to form a loop 5, and each loop 5 is thus defined by an outer belt portion 7 and by an underlying inner belt portion 9. The base 11 of the loop 5 is defined as being that zone of the loop that is closer to the middle portion of the belt 3, and the end 13 of the loop 5 is defined as being the zone of the loop that is opposite from said base 11 (i.e. the zone that is further from the middle portion of the belt 3).

When the collar is in the position in which it is tightened to the maximum extent, the space between the ends 13 of the loops 5 is at its minimum.

Each collar further comprises a tightening system that is described further on in the description below.

The outer belt portion 7 has a pushed-in portion 15 that is set back relative to the outer outline of the loop 5. Said pushed-in portion defines a tightening wall 17 against which the tightening system comes to bear. In addition, the pushed-in portion is flanked on either side by respective ones of two edge segments 19 of the outer belt portion 7.

Each edge segment is substantially rectilinear and connects a first point 20 of the outer belt portion that is situated immediately upstream from the pushed-in portion 15 to a second point 21 of the outer belt portion that is situated immediately downstream from the pushed-in portion 15. The first point 20 is generally close to the base 11 of the loop, and, advantageously, at said base 11. The edge segment 19 acts mechanically as a stay that is tensioned between the portion upstream from the pushed-in portion and the portion downstream therefrom.

The examples of clamping collars that are shown are of generally circular section. The tightening wall 17 then advantageously extends substantially radially, while the edge segments 19 form an angle A greater than 30° relative to a radius of the collar. The larger the angle A, the better the portion of the loop that is situated downstream from the tightening wall 17 is retained by the edge segments 13.

The tightening wall 17 is substantially plane. The pushed-in portion 15 optionally has another substantially plane wall 23 that faces the tightening wall 17 and forms a non-zero angle relative thereto. The walls 17 and 23 form the end wall of the pushed-in portion 15.

In the examples, the wall 23 bears against the inner belt portion 9. Since the tightening wall 17 extends substantially radially, the angle formed between the walls 17 and 23 is thus close to 90° (the larger the radius of the collar, the closer the angle is to 90°). When the wall 23 bears against the inner belt portion 9, it acts as a shoe for causing the radial forces that are exerted by the tightening system to be distributed over the inner belt portion 9. Then, the inner belt portion 9 in turn distributes said radial forces over the article to be tightened.

In another aspect of the collars of the invention, each loop 5 presents two openings 25 and 27 that are in register with each other. The first opening 27 is provided in the tightening wall 17. The second opening 25 is provided at the end 13 of the loop 5. In addition, the collar tightening system (described below) includes a shank 29 suitable for being engaged in the openings 25 and 27, so as to pass through each of the loops 5.

When the same collar is to be used for articles to be clamped that are of different diameters, it must be possible for the shank 29 of the tightening system to move radially relative to the ends 13 of the loops 5. In order to allow such a radial movement to take place, the two openings 25 are oblong, with their long dimensions extending radially (see FIGS. 5 to 8). If necessary, the first openings 27 can also be oblong.

A description follows of the tightening system that is used for all of the collars shown. It can be noted that other systems can be used, provided that they come into engagement against the tightening walls 17 and that they make it possible to bring the loops 5 closer together.

The tightening system considered comprises a nut-and-bolt assembly comprising a bolt with a threaded shank 29 and a bolt head 31, a nut 33, and a spacer 35 which, in this example, is sleeve-shaped. The diameter of the bolt is chosen such that said bolt can pass through the openings 25 and 27. Conversely, the diameter of the bolt head 31 and the diameter of the spacer 35 are chosen such that said bolt head and said spacer cannot pass through the openings 25 and 27. In the example, the spacer 35 is disposed between the nut 33 and the belt, but it could be disposed between the bolt head 31 and the belt. In addition, the spacer 35 can be either distinct from or else integral with or secured to the nut 33 or the bolt head 31.

Thus, the bolt head 31 and the nut 33, via the spacer 35, come into engagement against the tightening walls 17 of the loops 5. The spacer 35 is used for keeping the nut 33 or the bolt head out of the pushed-in portion 15, thereby enabling said nut to be driven easily using a tool. Naturally, the presence of the spacer 35 is optional. For example, no spacer 35 is necessary when the pushed-in portion 15 is wide enough to enable the nut 33 (or the bolt head 31) to be driven, or when the nut (or the bolt head) is long enough and projects from the pushed-in portion 15.

In addition, it is noted that the shape and the dimensions of the pushed-in portion 15 are advantageously chosen so as to prevent the bolt head 31 or the nut 31 from moving in rotation. Thus, it is not necessary to hold the bolt head or the nut, while the nut-and-bolt assembly is being tightened.

A description follows of the features of each of the examples of collars shown in FIGS. 1 to 7.

Figure 2:
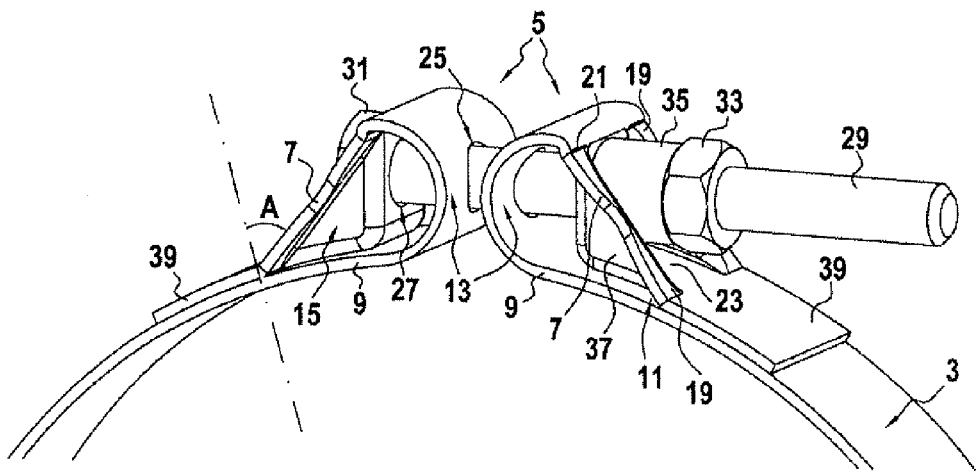

The first example of a collar shown in FIGS. 1 and 2 is such that the pushed-in portion 15 presents two side walls 37 that connect to the edge segments 19. Said side walls 37 thus extend between the walls 17 and 23 that form the end-wall of the pushed-in portion 15, and the edge segments 19 situated at the surface of the pushed-in portion 15 and on either side thereof.

In practice, the pushed-in portion 15 is formed by die-stamping the outer belt portion 7.

Figure 3:
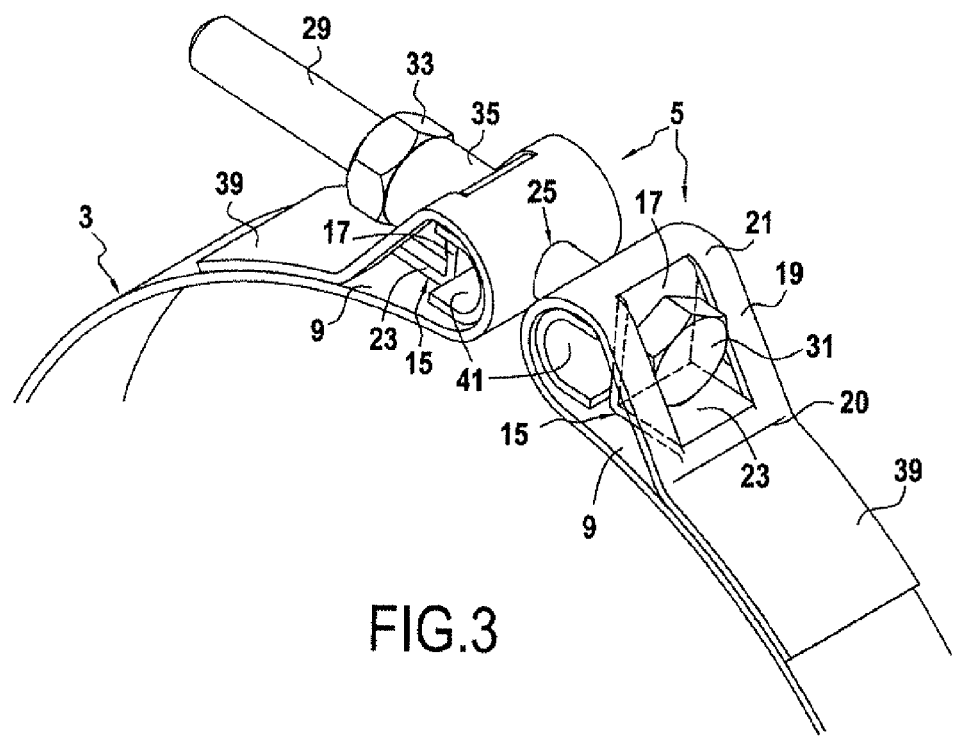
FIG. 3 shows a second example of a collar.

The second example of a collar shown in FIG. 3 is such that the pushed-in portion 15 is cut out from the outer belt portion 7 so as to be separate from the edge segments 19. This collar is thus not provided with side walls 37 and has recesses in their stead. The cuts made are thus side cuts only, along the edge segments 19, so that the pushed-in portion 15 presents an end wall, formed by the walls 17 and 23, and that is connected to the remainder of the outer belt portion 7 via its upstream edge and via its downstream edge.

In practice, the pushed-in portion 15 is formed by die-stamping the outer belt portion 7.

The collar of FIG. 3 further comprises reinforcing inserts 41. Each insert 41 is placed in the space provided inside the loop 5, between the tightening wall 17 and the end 13 of the loop 5, and it matches the inner outline of said space.

Said inserts 41 oppose deformation (flattening) of the loops 5 under the action of the tightening means. The tightening system does not come into engagement against said inserts 41, which are thus not comparable to the blocks of the prior art.

Unlike the blocks of the prior art, the inserts 41 do not need to be parts that (usually by being solid) are sufficiently rigid to transmit the tightening forces. Thus, in the example, the inserts 41 are made by cutting and shaping a metal strip. Advantageously, the strip is the same as the strip used for the collar, so that the cost of manufacturing the collar remains limited.

In the example, each insert 41 is trough-shaped with its end-wall being placed against the end 13 of the loop 5 and with its free ends being placed against the tightening wall 17.

Figure 4:
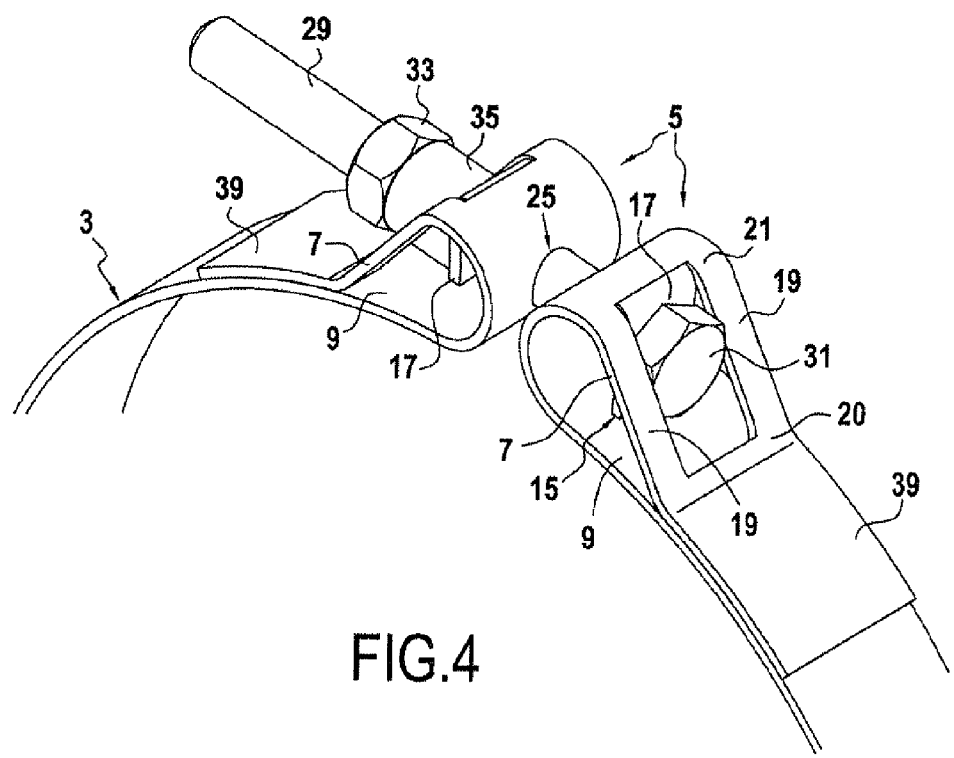
FIG. 4 shows a third example of a collar.

The third example of a collar, shown in FIG. 4, is analogous to the example shown in FIG. 3, except for the following differences only:

in order to form the pushed-in portion 15, a tongue is cut out from the outer belt portion, and said tongue is pushed in so that it forms the tightening wall 17; the pushed-in portion 15 has an end-wall formed by the tightening wall 17 only (it does not have a wall 23), which tightening wall is connected to the remainder of the outer band portion 7 via its downstream edge only; and the collar of FIG. 4 does not have an insert 41.

It should be noted that the belt of the collar of FIG. 4 must be sufficiently rigid at the tongue 17 for said tongue not to be pushed further into the loop 5 during tightening.

The collars of FIGS. 1 to 4 are such that each free end of the belt 3 is curved back outwards to form the loop 5, and an end portion 39 of the belt 3 is pressed and then welded or otherwise bonded against the outside face of the belt 3 so that, in this zone (i.e. in the zone situated immediately upstream from the base 11 of the loop 5), the collar presents two belt thicknesses.

Figure 5:
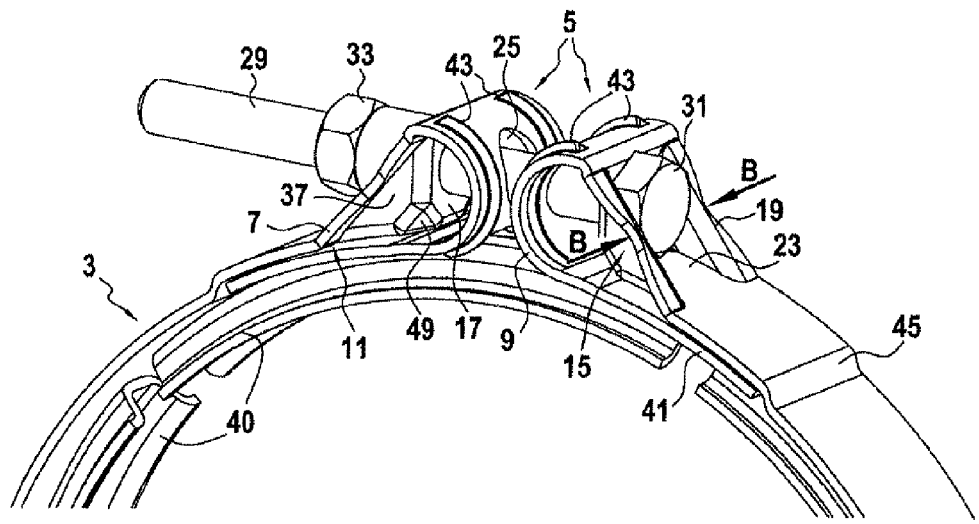
FIGS. 5 and 6 show a fourth example of a collar.
Figure 6:
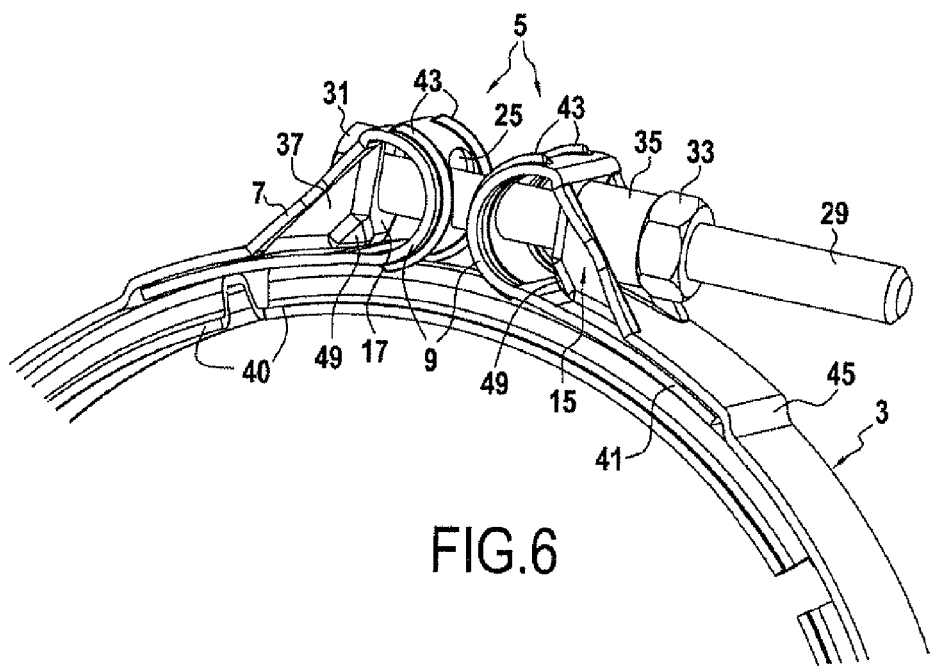

The fourth example of a collar, shown in FIGS. 5 and 6, is such that a belt portion, situated at the end 13 of the loop 5, presents two reinforcing ribs 43 extending circumferentially and situated on its side edges. Said ribs 43 make it possible to reinforce the strength of the loop 5 in order to prevent it from being deformed (flattened) under the action of the tightening means. These ribs 43 are formed by die-stamping the belt.

The pushed-in portion 15 of the collar of FIGS. 5 and 6 is such that it has side walls 37 (like the collar in FIGS. 1 and 2); and such that the tightening wall 17 and the wall 23 define between them an intersection line. In addition, the pushed-in portion 15 has facets 49 in the junction zones between the intersection line and the side walls 37. Said facets 49 are formed while the pushed-in portion 15 is being formed by die-stamping.

The facets 49 make it possible to limit the phenomenon of narrowing, indicated by the arrows B, that is localized in the middle portions of the arms 19, and that takes place during the die-stamping. By means of the facets 49, the quantity of material pushed in at said intersection line is smaller, so that the reduction in the width of the edge segments 19, in register with the intersection line, is also smaller.

Finally, it should be noted that a plurality of segments 40 that are V-shaped and U-shaped in cross-section and whose concave sides face towards the inside of the belt 3 are mounted on the inside face of the belt 3. This makes it possible, for example, to use the collar to connect together end-to-end two tubes having frustoconical ends.

Figure 7:
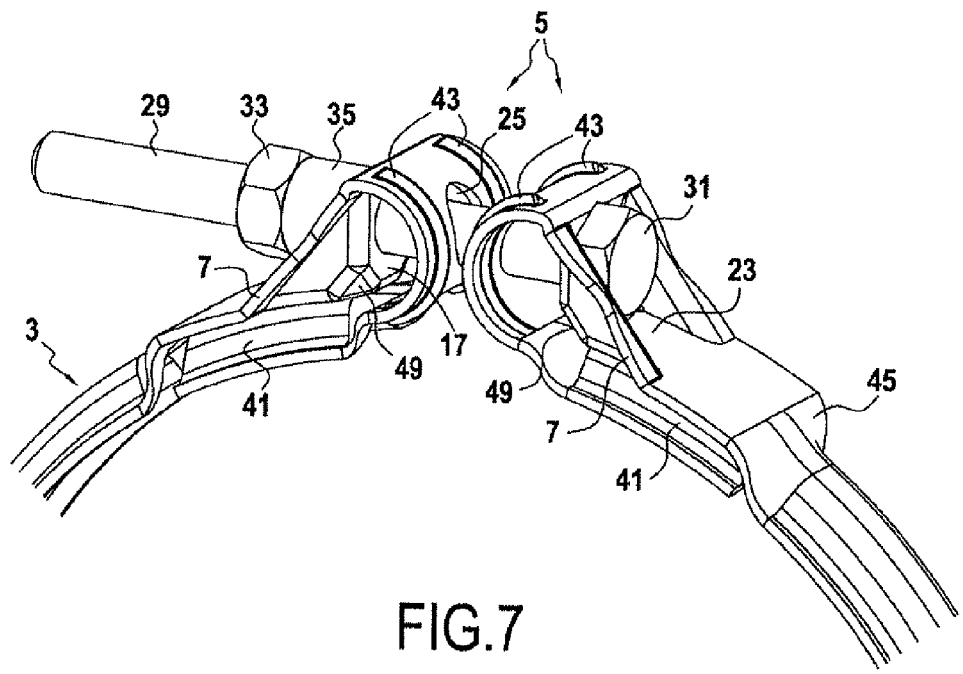
FIG. 7 shows a fifth example of a collar.

The fifth example of a collar shown in FIG. 7 is analogous to the example shown in FIG. 6 except for the sole difference that it does not have any segments mounted on the inside face of the belt 3 because it is the belt itself that is provided with a cross-section that is V-shaped or U-shaped and that has its concave side facing towards the center of the collar. It should be noted that only those belt portions that are designed to come into contact with the article to be clamped are provided with such a cross-sectional shape.

Figure 8:
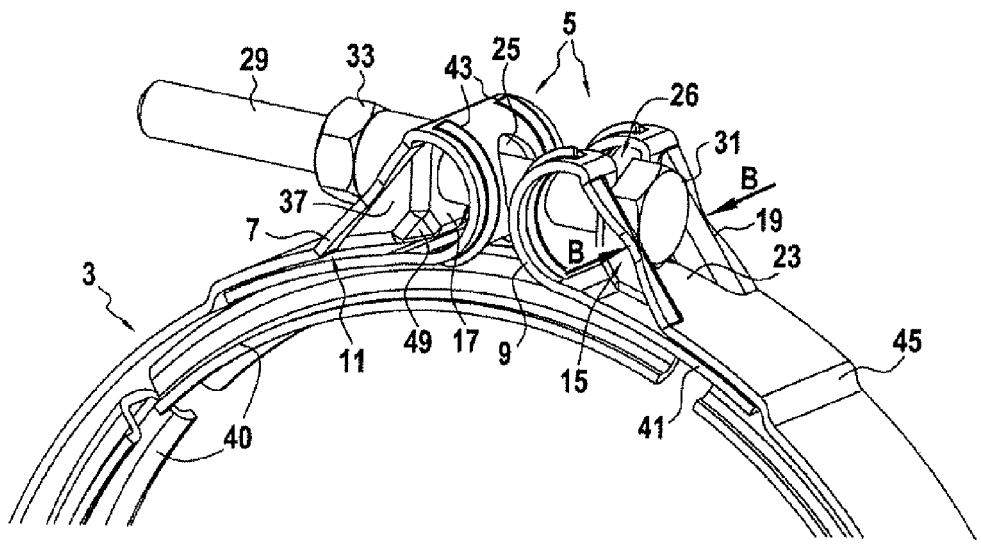
FIG. 8 shows a sixth example of a collar.

The sixth example of a collar that is shown in FIG. 8 is analogous to the collar in FIGS. 4 and 5, except for the sole difference that the openings 25 and 27 of the loop 5 receiving the bolt head 31, are constituted by the same single oblong opening 26 extending from the tightening wall 17 to the end 13 of the loop 5. Naturally, the oblong opening 26 could, by way of an alternative, be formed in the loop 5 receiving the nut 33 or in both loops 5. This makes it easy to open the collar by disengaging the shank 29 of the bolt from the loop(s) in question, and thus makes it easier to place the collar on the article to be clamped.

It should be noted that the collars in FIGS. 5 to 8 are such that each free end of the belt is curved back inwards to form the loop 5 and that an end portion 41 of the belt is pressed against the inside face of said belt 3, so that, in that zone (i.e. the zone situated immediately upstream from the base 11 of the loop 5), the collar presents two belt thicknesses. Said end portion 41 does not need to be welded or otherwise bonded to the belt 3 because it is not subjected to very much stress while the collar is being tightened. The tightening forces are exerted on the outer belt portion 7 of the loop 5. Advantageously, welding or other bonding operations are thus not performed while the collar is being manufactured.

While the collar is being tightened, said end portion 41 is compressed between the article to be clamped and the belt portion 3 that covers said end portion. Friction forces are then generated and they can be sufficient to prevent any circumferential movement of the end portion 41 and thus to oppose deformation of the loop 5. However, if said friction forces are insufficient, a shoulder 45 is formed on the belt 3, against which shoulder the end portion 41 comes into abutment while the collar is being tightened. In addition, the height of the shoulder 45 is at least approximately equal to and preferably equal to the thickness of the end portion 41 so as to guarantee that the clamping outline of the belt is continuous at said shoulder 45.

The shoulder 45 is, for example made by die-stamping, while the belt 3 is being shaped.

The invention claimed is:

1. A clamping collar comprising:
   a) a belt having two free ends, at least one of said free ends being curved back to form a loop, said loop being defined by an outer belt portion and by an underlying inner belt portion; and
   b) a tightening system suitable for co-operating with said loop so as to tighten said belt;
   wherein said outer belt portion presents a pushed-in portion, set back relative to the outer outline of the loop, which pushed-in portion defines a tightening wall with which the tightening system comes into engagement, said pushed-in portion being flanked on either side by respective ones of two edge segments of the outer belt portion.

2. The clamping collar according to claim 1, wherein the two free ends of said belt are curved back in such a manner as to form a loop, and wherein said tightening system makes it possible to bring said loops closer together so as to tighten said belt.

3. The clamping collar according to claim 1, wherein the pushed-in portion is cut out from the outer belt portion in such a manner as to be separate from the edge segments.

4. The clamping collar according to claim 1, wherein the pushed-in portion has two side walls that connect to the edge segments.

5. The clamping collar according to claim 1, wherein each edge segment is substantially rectilinear and connects a first point of the outer belt portion that is situated immediately upstream from the pushed-in portion to a second point of the outer belt portion that is situated immediately downstream from the pushed-in portion.

6. The clamping collar according to claim 1, having a section that is generally circular in shape, and wherein the tightening wall extends substantially radially.

7. The clamping collar according to claim 1, wherein the edge segments form an angle of at least equal to 30° with a radius of the collar.

8. The clamping collar according to claim 1, wherein the tightening wall is substantially plane and the pushed-in portion presents another substantially plane wall that faces the tightening wall and that forms a non-zero angle therewith.

9. The clamping collar according to claim 8, wherein said other wall bears against the inner belt portion.

10. The clamping collar according to claim 8, wherein the pushed-in portion has two side walls that connect to the edge segments, wherein the tightening wall and said other wall define between them an intersection line, and wherein the pushed-in portion has facets in the junction zones between the intersection line and the side walls.

11. The clamping collar according to claim 1, wherein said loop has a first opening provided in its tightening wall and a second opening in register with the first opening, and wherein the tightening system comprises a shank suitable for being engaged in said openings, in such a manner as to pass through said loop.

12. The clamping collar according to claim 11, wherein said second opening is oblong.

13. The clamping collar according to claim 1, wherein the tightening system comprises a nut-and-bolt assembly having the shank of its bolt passing through said loop, the bolt head or the nut coming respectively into engagement directly or via a spacer against the tightening wall of the loop.

* * * * *